LOCKING MECHANISMS

Original Filed March 19, 1962

INVENTORS
JOSEPH SCHREIBER &
GEORGE SCHREIBER
Claude A. Patalidis
ATTORNEY

United States Patent Office

Re. 26,272
Reissued Sept. 26, 1967

26,272
LOCKING MECHANISMS

Joseph Schreiber, 18507 Forrer, and George Schreiber, 18493 Winthrop, both of Detroit, Mich. 48235

Original No. 3,167,943, dated Feb. 2, 1965, Ser. No. 180,596, Mar. 19, 1962. Application for reissue Aug. 25, 1966, Ser. No. 582,179
9 Claims. (Cl. 70—358)

Matter enclosed in heavy brackets [ ] appears in the original patent but forms no part of this reissue specification; matter printed in italics indicates the additions made by reissue.

*ABSTRACT OF THE DISCLOSURE*

*A locking mechanism of the cylinder pin-tumbler lock type having an operating key provided with a cylindrical shank. The key cylindrical shank has a plurality of shallow depressions, each one being adapted to be aligned with one of the pin-tumbler assemblies and having an appropriate depth, according to the code combination of the lock, for displacing the corresponding pin-tumbler assembly of an appropriate amount such that the abutting ends of the pin and of the tumbler are substantially aligned with the "shear" surface between the rotatable plug and the stationary cylinder, so as to unlock the plug relatively to the housing.*

This invention relates in general to locking mechanisms and more particularly to improvements in cylinder tumbler locks and keys adapted to the operation thereof.

Tumbler locks hitherto available offer only a limited number of possible coding combinations. They afford limited protection because the limited number of available combinations results in the always present danger of locks capable of being unlocked by keys belonging to strangers. The saw-tooth type of key, designed to cooperate with tumbler locks well-known in the art, is fragile, easily bent or broken. Due to the sharp edges of its saw teeth, it causes damage to loose objects in a pocket or purse and can even tear the material lining a pocket or purse. A saw-tooth key is difficult to insert in a key-hole as it can be inserted only in a given position because the key-hole is actually a slot. No anterior art lock is really pick-proof because of the limited number of possible combinations and the resulting limited number of pins or tumblers.

The saw-tooth type of key is subject to also another inconvenience: the sharp edges of the saw teeth are prone to wear and may be easily damaged to such an [amount] *extent* that a key may, with time, become unable to unlock a lock for which it was originally coded or "cut."

A principal object of the present invention is therefore to provide a locking mechanism affording a means of greatly increased possible combinations resulting in positive protection and decreasing greatly the potential risk of too many keys capable of fitting a given lock.

Another object of the invention is to provide a cylinder pin-tumbler lock using a key that is not subject to be easily damaged or to cause damage to objects rubbing against it in a pocket or a purse, and which is not prone to pierce or deteriorate the lining of said pocket or purse.

A further object of the invention is to provide a lock affording greatly increased protection over the previous art by being practically pick-proof due to its greatly increased number of pin-tumbler assemblies.

Still another object of the invention is to provide a lock operable by a key which is readily insertable into the key-hole, and which is not susceptible to be bent or twisted out of shape.

Still a further object of the invention is to provide a lock which is adaptable to many applications, which can be manufactured at low cost and by simple methods and which is readily interchangeable with existing cylinder locks.

Yet another object of the invention is to provide a cylinder pin-tumbler lock which is substantially shorter than previous art locks of a given combination, or alternately to provide a cylinder tumbler lock of a given combination which is much shorter than equivalent previous art lock.

Other objects and advantages will become apparent from the following description taken in conjunction with the drawings in which.

Figure 1:
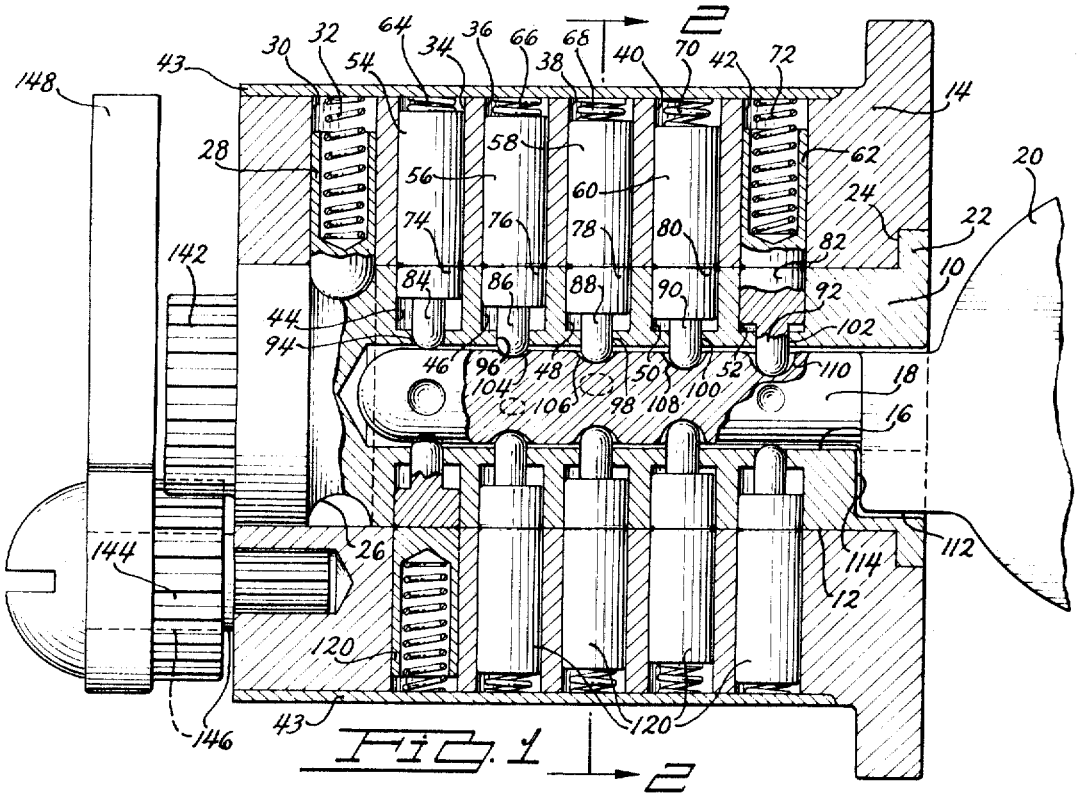
FIGURE 1 is a longitudinal partial cross sectional view of a cylinder pin-tumbler lock constructed according to the principles of the present invention, with a key corresponding to the appropriate lock combination inserted therein.
Figure 2:
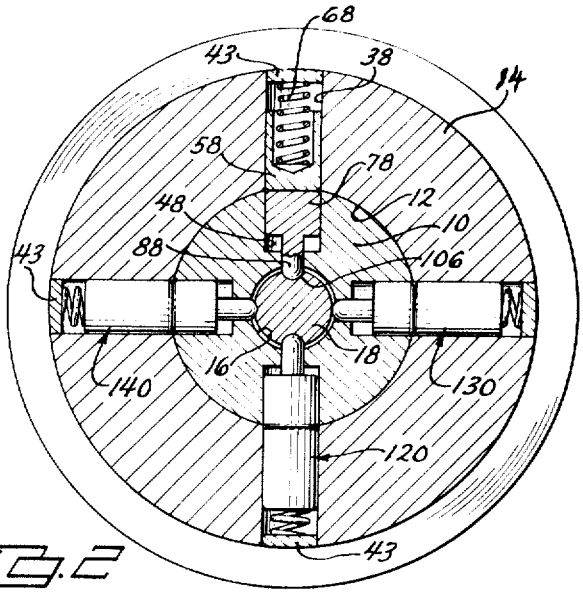
FIGURE 2 is a transversal cross sectional view along line 2—2 of FIGURE 1.

Referring now to the drawings and more particularly to FIGURES 1 and 2 thereof, the cylinder pin-tumbler lock of the invention is shown as comprising a cylindrical plug 10 coaxially and rotatably mounted in the longitudinal bore 12 of a substantially cylindrical barrel or housing 14. The plug 10 has a coaxial cylindrical bore, or key-hole, 16 for insertion therein of the shank 18 of a key 20.

The plug 10 is provided on one end with a shoulder 22 abutting against an undercut 24 in the housing, in order to prevent longitudinal motion in one direction of the plug relatively to the housing. The plug 10 is prevented from longitudinal motion in the other direction by means of a groove 26 cut on the periphery of the plug at its other end, and into which penetrates the conforming end of a pin 28 disposed in a radial bore 30 in the housing. A coil spring 32 biases the pin 28 for bottoming of its end into the groove 26. Several such pins thus disposed in appropriate radial bores in the housing may be used if so desired, although one pin is generally sufficient to hold the plug-housing assembly securely together.

The housing 14 has a plurality of radial bores 34–42, substantially in a row as shown and normally peripherally closed by a removable cover plate 43. The plug 10 has an equal number of corresponding radial bores 44–52, normally having their axes aligned with the bores 34–42. In bores 34–42 of the housing are disposed tumblers 54–62 biased toward the centerline of the plug-housing assembly by means of coil springs 64–72. In bores 44–52 of the plug are disposed shouldered pins 74–82, which are provided with reduced diameter portions 84–92 capable of projecting a predetermined distance within the longitudinal bore 16 of the plug through the reduced portions 94–102 of bores 44–52 respectively. The pins are also normally biased toward the center line of the lock assembly by the action of the springs 64–72 being transmitted to the pins by way of the tumblers.

Tumblers 54–62 are all of equal length. Shouldered pins 74–82 have bodies of varied lengths corresponding to a predetermined code. With no key shank in the plug bore 16, the tumblers push the pins until their shoulders abut against the bottom of the bores 44–52. This action enables the tumblers to penetrate part of the way into the bores 44–52 of the plug, thus preventing the plug from being rotated in relation to the housing 14.

When the shank 18 of a key such as key 20 is introduced in the bore 16 of the plug shallow substantially concave depressions on the surface of the shank, identified by numerals 104, 106, 108 and 110, are engaged by the rounded ends of the reduced portions of the pins. In the example shown in FIGURE 1, the key shank has no depression corresponding to the end of reduced portion 84 of pin 74, which therefore bears directly on the shank surface.

Another set of pin-tumbler assemblies may be disposed at 180° from the above described set of pin-tumbler assemblies, and such as shown in FIGURES 1 and 2 where the second set of pin-tumbler assemblies is generally designated by numerals 120. A third and a fourth sets 130 and 140 (FIGURE 2), may also be disposed with the axes of their pin-tumbler assemblies in a plane at a 90° angle with the plane of the axes of the first and second sets. The key shank has evidently a row of shallow depressions of varied depths for each one of such set or row of pin-tumbler assemblies.

The varied depths of the shallow depressions on the key shank 18 correspond to and compensate for the varied lengths of the pins in order to bring the surfaces of contact of the tumblers and pins substantially in a plane along the cylindrical shear surface between the housing 14 and the plug 10, the cylindrical shear surface corresponding to the bore 12 in the housing. The pins being thus lifted to the shear cylindrical surface, the plug is made free to rotate in relation to the housing, and rotating the key 20 causes tab 112 of the key, introduced into a slot 114 in the end of the bore 16 in the plug, to drive the plug for rotary motion in relation to the housing.

In the example of FIGURES 1–2 a total number of 20 pin-tumber assemblies has been shown. It is evident that such a number of pin-tumbler assemblies permits coding combinations amounting to billions and affords great protection by insuring that no two lock combinations would be the same.

Also in the example of FIGURES 1–2, the end of the plug 10 is shown driving a gear 142 which in turn drives a gear 144 mounted for rotation around a pin 146 threaded, pressed or otherwise fastened in the housing 14. A lever 148, integral with the gear 144 or otherwise affixed thereto for rotation thereby, normally actuates a bolt, not shown, to unfasten a door, chest, lid, drawer, etc., associated with the locking mechanism.

Figure 3:
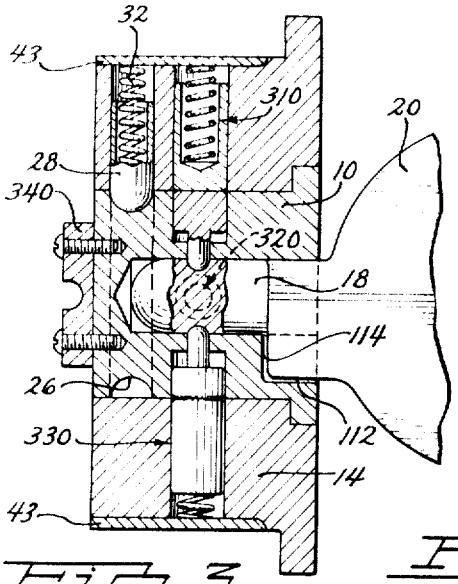
FIGURE 3 is a view similar to FIGURE 1, but showing a modification of the invention.

It is evident that the latch or bolt mechanism is no part of the present invention and the plug of the invention can be adapted to drive any type of commercially available latch or bolt mechanism, one such type of drive being represented by numeral 340 of FIGURE 3.

The embodiment of FIGURE 3 illustrates a cylinder lock, according to the teaching of the invention, which is similar to the embodiment of FIGURES 1–2, with the difference that only one radially disposed pin-tumber assembly 310 is used, instead of the five assemblies in each row as shown in FIGURES 1–2. Several such pin-tumbler assemblies can be radially disposed as indicated generally by numerals 320 and 330. This arrangement provides for a wafer-like cylinder lock of short overall length which may be disposed in relatively thin panels. Four or more such pin-tumbler assemblies permit a reasonable number of combination.

It is obvious that locking mechanisms having any number of pin-tumbler assemblies in each radial row can be produced to conform with any panel thickness and to provide any number of combinations, and such is contemplated as being one of the advantages of the present invention.

It is also obvious that the invention is not to be limited to the specific embodiments as herein illustrated and described, but may be used in other ways without departing from its spirit and scope as defined by the following claims.

What is claimed as new is:

1. A locking mechanism comprising in combination: a substantially cylindrical statioary barrel-like housing having a cylindrical longitudinal axial bore extending from end to end; a cylindrical plug rotatably and coaxially disposed in said bore in said housing [;], said plug having a cylindrical longitudinal coaxial bore open at one end and closed at the other end; a shoulder on the peripheral surface of said plug situate coaxially the open end of said plug; a corresponding enlarged diameter portion on the longitudinal bore of said housing; a circular groove on the peripheral surface of the other end of said plug; a slidable pin disposed in said housing and biased toward the axis of said housing for forcing the end of said pin to abut against the bottom of said groove for securely maintaining said plug within the longitudinal bore of said housing whilst still allowing rotation of said plug in relation to said housing; at least one row of first radial bores in said housing; second radial bores in said plug normally axially aligned with said first radial bores and having a main diameter portion substantially equal to the diameter of said first radial bores and a reduced diameter portion leading into the coaxial bore in said plug; a tumbler in each said first radial bore; a pin in each said second radial bore, each pin having a reduced diameter portion with a hemispherical end adapted to normally project within the coaxial bore in said plug through the reduced diameter portion of said second radial bore and a plurality of said pins having varied body lengths according to a predetermined code; coil springs normally urging said tumblers and their corresponding pins towards the common axis of said housing and plug, and forcing said tumblers part of the way into said second radial bores of an amount determined by the length of the enlarged body portion of the corresponding pin, for normally locking said plug and said housing together; a removable cover plate covering each row of said first radial bores in said housing and normally maintaining said coil springs under compression; a key having a substantially cylindrical shank portion adapted to be introduced all the way into the coaxial bore in said plug; depressions on the surface of said shank according to said predetermined code for lifting said pins of an amount corresponding to their respective varied body lengths to cause the abutting surfaces of said tumblers and pins to be aligned with the adjoining ends of said first and second radial bores for unlocking said plug from said housing; (and) a tab integral with said shank for introduction into a slot in the open end of the coaxial bore in said plug for rotatably driving said plug in relation to said housing; *and driving means at the closed end of said plug for operating a latching mechanism when said plug is rotated.*

2. The locking mechanism of claim 1 wherein said housing, plug and key are of substantially short over-all lengths and said tumblers and pins are disposed substantially in a circular radial row.

3. The locking mechanism of claim 1 wherein *said driving means comprises* a first gear [is] fastened to the outer surface of the closed end of said plug for rotation thereby; a second gear [meshes] *meshing* with said first gear and [is] rotatable around a shaft affixed to said housing; and a lever [is] fastened to said second gear for actuation thereby for the purpose of driving [a] *said* latching mechanism [when said key is rotated].

*4. A locking mechanism comprising in combination: a substantially cylindrical stationary barrel-like housing having a cylindrical longitudinal axial bore extending from end to end; a cylindrical plug rotatably and coaxially disposed in said bore in said housing, said plug having a cylindrical longitudinal coaxial bore having at least one open end; a shoulder on the peripheral surface of said plug situate coaxially the open end of said plug; a correspondingly enlarged diameter portion on the longitudinal bore of said housing; a circular groove on the peripheral surface of the other end of said plug; a slidable pin disposed in said housing and biased toward the axis of said housing for forcing the end of said pin to about against the bottom of said groove for securely maintaining said plug within the longitudinal bore of said housing whilst still allowing rotation of said plug in relation to said housing; at least one row of first radial bores in said*

*housing; second radial bores in said plug normally axially aligned with said first radial bores and having a main diameter portion substantially equal to the diameter of said first radial bores and a reduced diameter portion leading into the coaxial bore in said plug; a tumbler in each said first radial bore; a pin in each said second radial bore, each pin having a reduced diameter portion with a hemispherical end adapted to normally project within the coaxial bore in said plug through the reduced diameter portion of said second radial bore and a plurality of said pins having varied body lengths according to a predetermined code; coil springs normally urging said tumblers and their corresponding pins towards the common axis of said housing and plug, and forcing said tumblers part of the way into said second radial bores of an amount determined by the length of the enlarged body portion of the corresponding pin, for normally locking said plug and said housing together; a removable cover plate covering each row of said first radial bores in said housing and normally maintaining said coil springs under compression; a key having a substantially cylindrical shank portion adapted to be introduced all the way into the coaxial bore in said plug; depressions on the surface of said shank according to said predetermined code for lifting said pins of an amount corresponding to their respective varied body lengths to cause the abutting surfaces of said tumblers and pins to be aligned with the adjoining ends of said first and second radial bores for unlocking said plug from said housing; a tab integral with said shank for introduction into a slot in the open end of the coaxial bore in said plug for rotatably driving said plug in relation to said housing; and driving means on the end of said plug having said circular groove for operating a latching mechanism when said plug is rotated.*

*5. The locking mechanism of claim 4 wherein said housing, plug and key are of substantially short over-all lengths and said tumblers and pins are disposed substantially in a circular radial row.*

*6. The locking mechanism of claim 4 wherein said driving means comprises a first gear fastened to said end of said plug for rotation thereby; a second gear meshing with said first gear and rotatable around a shaft affixed to said housing; and a lever fastened to said second gear for actuation thereby for the purpose of driving said latching mechanism.*

*7. A locking mechanism for operating a latching mechanism and comprising in combination: a substantially cylindrical stationary barrel-like housing having a cylindrical longitudinal axial bore extending from end to end; a cylindrical plug rotatably and coaxially disposed in said bore in said housing, said plug having a cylindrical longitudinal coaxial bore having at least one open end; a shoulder on the peripheral surface of said plug situate coaxially the open end of said plug; a correspondingly enlarged diameter portion on the longitudinal bore of said housing; a coaxial concentric circular groove on the peripheral surface of the other end of said plug; spring biased means disposed in said concentric circular groove for securely maintaining said plug within the longitudinal bore of said housing whilst still allowing rotation of said plug in relation to said housing; first radial bores in said housing; second radial bores in said plug normally axially aligned with said first radial bores and having a main diameter portion substantially equal to the diameter of said first radial bores and a reduced diameter portion leading into the coaxial bore in said plug; a tumbler in each said first radial bore; a pin in each said second radial bore, each pin having a reduced diameter portion with a hemispherical end adapted to normally project within the coaxial bore in said plug through the reduced diameter portion of said second radial bore and a plurality of said pins having varied body lengths according to a predetermined code; coil springs normally urging said tumblers and their corresponding pins towards the common axis of said housing and plug, and forcing said tumblers part of the way into said second radial bores of an amount determined by the length of the enlarged body portion of the corresponding pin for normally locking said plug and said housing together; a cover plate covering said first radial bores in said housing and normally maintaining said coil springs under compression; a key having a substantially cylindrical shank portion adapted to be introduced all the way into the coaxial bore in said plug; depressions on the surface of said shank according to said predetermined code for lifting said pins of an amount corresponding to their respectively varied body lengths to cause the abutting surfaces of said tumblers and pins to be aligned with the adjoining ends of said first and second radial bores for unlocking said plug from said housing; means integral with said shank for rotatably driving said plug in relation to said housing when said shank is introduced all the way in the coaxial bore in said plug; and means driven by said plug for actuating said latching mechanism.*

*8. The locking mechanism of claim 7 wherein said housing, plug and key are of substantially short over-all lengths and said tumblers and pins are disposed substantially in a circular radial row.*

*9. The locking mechanism of claim 7 wherein said means driven by said plug comprises a first gear fastened to the end of said plug having said peripheral groove proximate thereto for rotation thereby; a second gear meshing with said first gear and rotatable around a shaft affixed to said housing; and a lever fastened to said second gear for actuation thereby for the purpose of driving said latching mechanism.*

References Cited

The following references, cited by the Examiner, are of record in the patented file of this patent or the original patent.

UNITED STATES PATENTS

| | | | |
|---|---|---|---|
| 952,480 | 3/1910 | Summerfield | 70—370 |
| 977,085 | 11/1910 | Eras | 70—417 |
| 1,286,456 | 12/1918 | Vogelsang | 70—364 |
| 1,685,033 | 9/1928 | Cleaver | 70—364 |
| 1,832,108 | 11/1931 | Falk | 70—369 |
| 2,717,512 | 9/1955 | Sterling et al. | 70—379 X |

FOREIGN PATENTS

| | | |
|---|---|---|
| 213,735 | 2/1961 | Austria. |
| 1,158,653 | 1/1958 | France. |
| 1,201,967 | 7/1959 | France. |
| 260,810 | 8/1949 | Switzerland. |

MARVIN A. CHAMPION, *Primary Examiner.*

P. TEITELBAUM, *Assistant Examiner.*